(12) United States Patent
Lim et al.

(10) Patent No.: US 7,932,800 B2
(45) Date of Patent: Apr. 26, 2011

(54) METHOD AND APPARATUS FOR THREE-DIMENSIONAL INTEGRATION OF EMBEDDED POWER MODULE

(75) Inventors: Michele H. Lim, Blacksburg, VA (US); Zhenxian Liang, Niskayuna, NY (US); J. D. van Wyk, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 509 days.

(21) Appl. No.: 11/736,217

(22) Filed: Apr. 17, 2007

(65) Prior Publication Data

US 2007/0230221 A1    Oct. 4, 2007

Related U.S. Application Data

(63) Continuation-in-part of application No. 11/357,424, filed on Feb. 21, 2006, now Pat. No. 7,638,988.

(51) Int. Cl.
*H01F 27/08* (2006.01)
*H01F 29/06* (2006.01)
*H01F 27/28* (2006.01)
*H01F 7/06* (2006.01)
*H02M 3/335* (2006.01)
*H01H 63/00* (2006.01)

(52) U.S. Cl. ........... 336/200; 336/55; 336/61; 336/141; 336/232; 336/16; 29/602.1; 361/270

(58) Field of Classification Search ........... 336/200, 336/232, 55, 61, 141; 363/16; 29/602.1; 361/270
See application file for complete search history.

(56) References Cited

U.S. PATENT DOCUMENTS

| | | | |
|---|---|---|---|
| 5,532,667 A * | 7/1996 | Haertling et al. | 336/177 |
| 5,644,327 A * | 7/1997 | Onyskevych et al. | 345/80 |
| 2005/0028601 A1 * | 2/2005 | Pedersen et al. | 73/718 |
| 2005/0229385 A1 * | 10/2005 | Pleskach et al. | 29/602.1 |
| 2006/0109632 A1 * | 5/2006 | Berlin et al. | 361/719 |
| 2007/0064429 A1 * | 3/2007 | Mazzochette et al. | 362/296 |

OTHER PUBLICATIONS

Z. Liang et al.; "Embedded Power-a Multilayer Integration Technology for Packaging of IPEMs and PEBBs"; 0-7803-6437-6/00/$10.00; 2000 IEEE; pp. 41-44.
A. Pernia et al.; "Thick-Film Hybrid Technology for Low-Output-Voltage DC/DC Converter"; IEEE Transactions on Industry Applications, vol. 40 No. 1, Jan./Feb. 2004; pp. 86-93.
Z. Liang et al.; "Integrated Packaging for a High Frequency Voltage Regulator Application"; NSF-ERC Center for Power Electronics System, Virginia Polytechnic Institute and State University, Apr. 2005.
Z. Liang et al.; "Embedded Power Technology for IPEMs Packaging Applications"; 0-7803-6618-2-01-$10.00, 2000 IEEE; pp. 1057-1061.
Kulke et al.; "LTCC—Multilayer Ceramic for Wireless and Sensor Applications"; pp. 1-8, Mar. 2005.

* cited by examiner

*Primary Examiner* — Elvin G Enad
*Assistant Examiner* — Ronald W Hinson
(74) *Attorney, Agent, or Firm* — Whitham Curtis Christofferson & Cook, PC

(57) ABSTRACT

A modified planar Low Temperature Co-Fired Ceramic (LTCC) high conductance inductor, embedding a large cross section conductor, supports a stacked arrangement of heat spreader, inductor and active device layers. Interlayer electrical connections connect the layers. Optionally, a DC-DC converter includes the modified planar LTCC high conductance inductor, embedding a large cross section conductor, supporting a stacked arrangement of heat spreader, capacitor and active device layers, the active devices layer including the switching transistors. The active devices layer may include semiconductor dies embedded in a substrate.

42 Claims, 11 Drawing Sheets

METHOD AND APPARATUS FOR THREE-DIMENSIONAL INTEGRATION OF EMBEDDED POWER MODULE

CROSS-REFERENCE TO RELATED APPLICATION(S)

This patent application is a continuation-in-part (CIP) of U.S. patent application Ser. No. 11/357,424, filed Feb. 21, 2006 now U.S. Pat. No. 7,638,988, the specification of which is incorporated herein by reference.

This invention was made with United States Government support under Grant No. EEC9731677, awarded by the National Science Foundation. The United States Government may have certain rights in this invention.

FIELD OF THE INVENTION

The present invention relates generally to circuit and component technology and, more specifically, to switching-type power regulation circuits having requirements for high power and small packaging.

BACKGROUND OF THE INVENTION

As known in the art, a switching voltage regulator (SVR) receives an electrical power from a source such as, for example, a battery or AC-DC rectifier, and outputs electrical power at a controlled or regulated voltage.

A typical SVR includes transistor-based switching circuits, which may be referenced as "actives," connected to reactive elements, i.e., inductors and capacitors, which may be referenced as "passives." The transistor-based switching circuits may be implemented, at least in part, with integrated circuitry. However, typically, one or more of the reactive elements has a large value (i.e., microfarads or microhenrys) and, therefore, cannot be practically implemented in the integrated circuit with the actives. This is particularly true for high power applications where high switching currents through the reactive elements require low electrical resistance and low stray reactance.

For SVRs in portable electronic equipment such as, for example, laptop computers, "smart phones" other kinds of personal digital assistants (PDAs), smaller size and good dissipation of heat are becoming increasingly important as design requirements.

Heat dissipation is an increasing problem with SVRs, because their power requirements are increasing. The power requirement is increasing because of increasing demand for computational power in portable electronic equipment. Increasing computational power requires more complex semiconductor circuits, i.e., more transistors and interconnects, and higher clock speed that, in turn, increases power consumption.

The SVR heat dissipation problem is often exacerbated because, in addition to delivering more power, the SVR must be physically smaller packages.

In addition, there is increasing demand for improved power efficiency in SVRs. For example, resistive loss wastes battery power, lowers the power actually delivered by the SVR, and increases the heat the SVR generates. Since the structure of the SVR must accommodate this heat, but the heat represents wasted power, the SVR design or the powered circuit design may have to be compromised, to meet overall power and heat budget.

The concurrent demand for SVR higher power and smaller SVR packages, presents problems that are difficult to solve with present SVR circuit technologies.

For example, SVRs require large value output inductors. Because of high current and low resistance requirements, these SVR inductors are generally implemented as separate components, packaged and arranged in a manner occupying area on a substrate and often requiring long connection paths.

The present inventors have identified that Low Temperature Co-Fired Ceramic (LTCC) inductors have characteristics that, if LTCCs were suitable for SVRs, would provide benefits. However, known LTCC inductors are generally unsuitable for high current applications such as, for example, power supplies or voltage regulators. They are unsuitable because the inductive elements are thin, high resistance conductors that cannot carry high current.

Stated more specifically, the conductors in known LTCC inductors are made by screen-printing conductive ink patterns (e.g. comprising silver particles) on sheets of green (i.e. unfired) ferromagnetic ceramic material. Multiple green sheets with printed conductor patterns are then stacked and fired at high temperature, causing the sheets and conductive ink to bond by sintering. The printed conductors are thin; typically conductive ink is about 0.001" thick, and the green sheets are about 0.002-0.005" thick. The conductive ink is applied as a printed film because the green ceramic sheets must be close enough to one another to fuse by sintering. Because of the printed conductor structure of LTCC inductors, the conductive wiring formed from the conductive ink is too thin to carry large currents.

Related to having thin conductors, another shortcoming of known LTCC inductors is that the ferromagnetic ceramic material is typically a poor heat conductor.

These and other limitations and shortcomings have prevented LTCC inductors from being used in high power electronics applications and, instead, has relegated LTCC inductors to applications such as RF filters, tuners and the like.

Prior art high power SVRs are therefore constructed with discrete inductors and associated connections, with resulting resistive losses and stray reactance. Further, the discrete inductors and other structural features of prior art SVRs often result in heat sources, requiring heat conduction and heat sink structures that occupy volume. Further, the discrete inductors and other structural features of prior art SVRs often require that the heat sources be arranged for practical thermal connection with heat sinks, and these arrangements may compromise the electrical performance of the SVR.

SUMMARY OF THE INVENTION

It is therefore an object of the present invention, in view of these and other shortcomings of the prior art, to provide a three-dimensional integrated module, having a high conductance embedded LTCC inductor forming a large support area for circuitry and structure.

It is another object of the invention to provide a three-dimensional integrated module, having a high conductance embedded LTCC inductor with high current capability, in a low profile layered arrangement, with short interlayer electrical connections, providing a low-profile and high-efficiency.

It is another object of the invention to provide a three-dimensional integrated module, having a high conductance embedded LTCC inductor, and having a planar, low profile shape and aspect ratio, for smaller size and for significantly improved air flow over the apparatus.

According to one embodiment, a three-dimensional integrated module includes a planar, low-profile high conductance LTCC inductor, having a support surface, and a low-profile heat spreader disposed on the support surface.

According to one embodiment, a three-dimensional integrated module includes a planar, low-profile high conductance LTCC inductor, having a support surface, and a capacitor layer disposed on the support surface According to one embodiment, a three-dimensional integrated module includes a planar, low profile high conductance LTCC inductor, having a support surface, with a low-profile heat spreader and a capacitor layer disposed, in any order, on the support surface.

According to one embodiment, a three-dimensional integrated module includes a planar, low-profile high conductance LTCC inductor, having a support surface, and a low-profile heat spreader and a capacitor layer disposed, in any order, and a heat sink on the support surface According to one embodiment, an SVR is provided as a three-dimensional integrated module having a planar, low-profile high conductance LTCC inductor element according to one or more embodiments, having a circuit support surface, a capacitor layer, a low-profile heat spreader, and at least one active circuit layer, in any order, supported on the circuit support surface.

According to one aspect of one or more embodiments, the actives layer is a substrate having recesses and has embedded active elements supported by the recesses.

According to one aspect of one or embodiments, the actives layer has a chip support area and contact pads for discrete components.

According to one aspect of one or more embodiments, the heat spreader layer has clearance holes, and through conductors are arranged to extend through the clearance holes, to connect layers of the three-dimensional integrated module above and below the heat spreader layer.

According to one aspect of one or more embodiments, the capacitor layer has clearance holes, and through conductors are arranged to extend through the capacitor layer clearance holes, to connect layers of the three-dimensional integrated module above and below the capacitor layer.

According to its various embodiments, a three-dimensional integrated module of the present invention reduces packaging overhead as compared to the prior art. The packaging overhead is reduced in part because the high conductance LTCC inductor functions both in an electrical capacity and a structural capacity; its large area planar top and bottom surfaces function as support surfaces for circuitry and for heat sink structures.

According to its various embodiments, the three-dimensional integrated module of the present invention improves electrical efficiency over the prior art. The layered structure allows short interlayer connections, without jumps and with minimum lateral traces.

One or more embodiments of the present invention include a planar heat spreader with the invention's high-conductance planar LTCC inductor. These and other embodiments of the invention, in addition to providing reduced packaging overhead, include a high thermal conduction, large area, distributed heat carrying structure—effectively the entire area of any layer or layers the module. This provides even spreading of heat from concentrated heat sources over a large planar area. This provides significant thermal improvement over prior art structures. Further, the planar, low profile module of the embodiments and their various aspects provides less turbulent airflow.

The various embodiments and aspects of the invention provide these and other benefits, and are therefore each a significant advance in the art of reactive elements, heat dissipation and high power circuits, including SVRs.

According to one aspect, the LTCC high conductance inductor of the present invention is formed of a planar, low profile modified low temperature co-fired ceramic (LTCC) element comprising a plurality of ceramic sheets stacked in parallel, embedding a conductor having substantial height and cross-section, and sintered together.

According to one aspect, a first of the ceramic sheets has an elongated slot extending through the sheet, from a first end to a second terminal end. An elongated conductor fills and is supported by the slot. Since the slot extends through the sheet the conductor height, or thickness is the entire thickness of the sheet. The conductor thickness is therefore significantly greater than the printed conductors of prior art LTCC inductors. According to the aspect, the elongated conductor supported in the through slot of the first sheet extends from the first terminal end to the second terminal end of the slot. According to this aspect, a second of the ceramic sheets faces the first ceramic sheet, i.e., the sheet having the elongated conductor and includes a first vertical through hole aligned above the first terminal, supporting a first vertical conductor connected to the first terminal end, and a second vertical through hole aligned above the second terminal end, supporting a second vertical conductor connected to the second terminal end.

According to one aspect of one or embodiments, the planar, low-profile LTCC high conductance inductor comprises different sheets of different permeability, to provide certain selectivity of inductance varying with respect to current, and to provide certain selectivity of frequency-dependent characteristics

DETAILED DESCRIPTION OF ILLUSTRATIVE EMBODIMENTS

Figure 1:
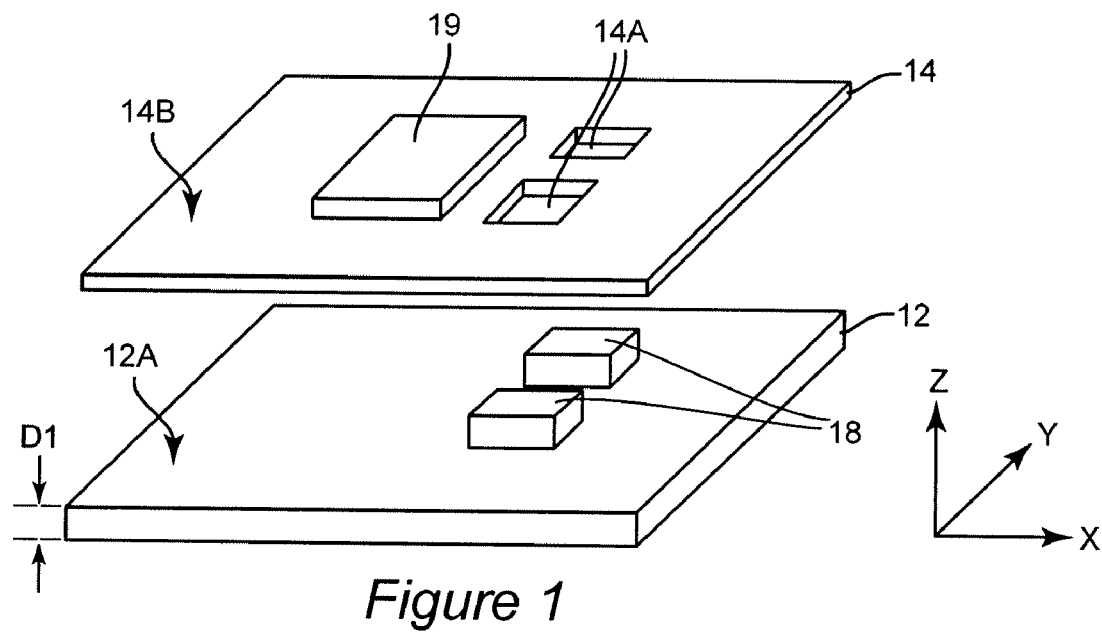
FIG. 1 shows, in a perspective partially exploded view, one illustrative example of a three-dimensional integrated module according to one embodiment according to the present invention, having a planar, low-profile high conductance LTCC inductor, having a support surface, and a capacitor layer disposed on the support surface.

The following detailed description of the invention is in reference to accompanying drawings, which form a part of this description but are only illustrative examples of various embodiments in which the invention may be practiced. The invention is not limited, however, to the specific examples described herein and/or depicted by the attached drawings. Other configurations and arrangements embodying or practicing the present invention can, upon reading this description, be readily implemented by persons skilled in the arts.

In the drawings, like numerals appearing in different drawings, either of the same or different embodiments of the invention, reference functional or system blocks that are, or may be, identical or substantially identical between the different drawings.

Various embodiments of the invention, although different, are not necessarily mutually exclusive. For example, a particular feature, function, act or characteristic described in one embodiment may, within the scope of the invention, be included in other embodiments.

Various instances of the phrase "in one embodiment" do not necessarily refer to the same embodiment.

Unless otherwise stated or made clear from its context, the terminology and labeling used herein is not limiting and, instead, is only for purposes of internal consistency in referencing the examples.

As will be understood by persons skilled in the art upon reading this description, certain well-known structures, algorithms, acts and operations that are employed in the described are omitted, or are not described in detail, so as to better focus on, and avoid obscuring the novel features of the present invention.

Unless otherwise stated or clear from the description, depictions described as "exploded" and "assembled" views are only for purposes of alternatively depicting a structural relation, and are not necessarily descriptive as to any kind or any order of fabrication or manufacture.

Unless otherwise stated or clear from its context in the description, the term "planar" means, with respect to a surface, extending substantially parallel to a plane and, with respect to a three-dimensional structure, means a dimensional aspect ratio such that the subject structure extends substantially more in a direction parallel to an arbitrary plane such as, for example, the plane defined by the X-Y axes in FIG. 1, than the structures dimension in a direction normal to that plane, and has no meaning or limitation as to geographic or gravitational direction.

Unless otherwise stated or clear from their context in the description, various instances of the term the terms "top" and "bottom" mean only a relative spacing, in any order, in a direction normal to a "planar" direction, without any meaning or limitation as to geographic or gravitational direction.

Unless otherwise stated or clear from their context in the description, various instances of the terms "disposed on," "arranged on" "laminated arrangement," and "provided on" mean only a spatial relationship of structure(s), and have no limitation or meaning, either as to kind or order, of any method, steps, processes, or acts carried out in the structure(s)' making or fabrication.

FIG. 1 shows a partially exploded view of an exemplar 10 of one embodiment of a module according to the present invention, comprising in a single, substantially planar, laminated-type structure, a high conductance LTCC embedded inductor 12 according to one or more embodiments described below, and a capacitor 14.

With continuing reference to the example three-dimensional module of FIG. 1, the example high conductance LTCC inductor 12 is planar, having a top supporting surface 12A. The LTCC inductor 12 also provides a supporting surface on its bottom (not shown) that may support structure such as, for example, any structure in accordance with any embodiment in this disclosure.

The high conductance LTCC inductor 12 according to the present invention will now be described in detail. Its structure and method for manufacture is a significant advance in the art, its ceramic layer form is different from the prior art, and its conductor thickness is significantly greater than the conductor thickness of prior art LTCC inductors.

Figure 2:
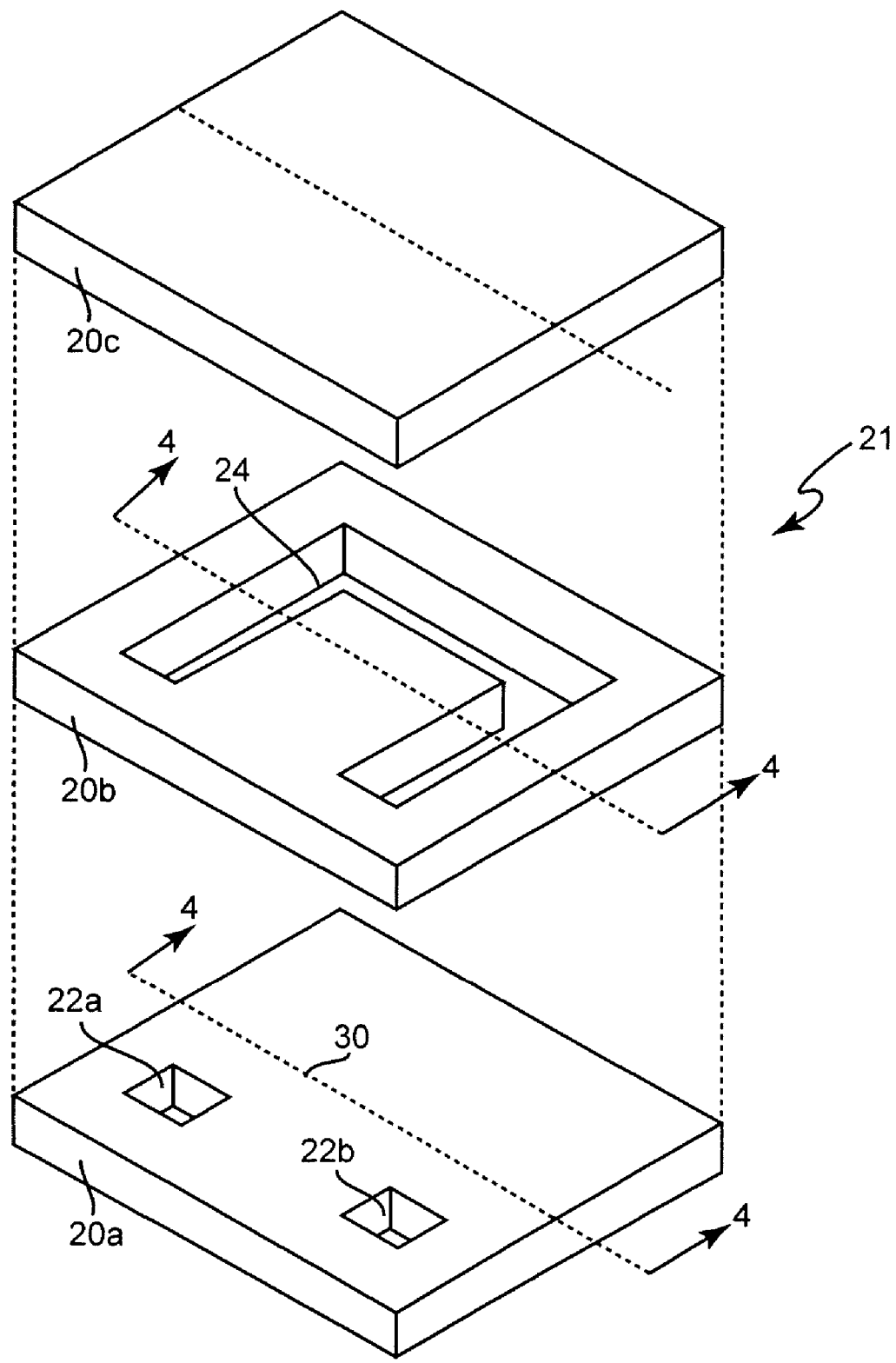
FIG. 2 shows an exploded view of one illustrative embodiment of an embedded high conductance LTCC inductor according to the present invention.

FIG. 2 shows an exploded view of one illustrative example 21 of one high conductance LTCC inductor of the present invention. The FIG. 2 example high conductance LTCC inductor 21 may implement the LTCC inductor 12 of FIG. 1.

Referring to FIG. 2, the illustrative example high conductance LTCC inductor 21 comprises three ceramic sheets 20a 20b 20c (generally referenced as "20"). The quantity of ceramic sheets 20 shown in FIG. 2 is only an example; embodiments of the embedded LTCC inductor of the present invention may have more than three ceramic sheets.

The word "sheet" as used herein, unless otherwise stated or otherwise clear from its context, means planar structures such as illustrated by 20a, 20b and 20c. Ceramic sheets 20 may be formed as, or from, either one layer of material or a stack of constituent layers (not shown). The ceramic sheets 20 may have any thickness; one example range is from about 0.005 to about 0.050 inches thick. The sheets 20 may be made from a stack of ceramic layers (not shown) that are each, for example, about 0.003" or about 75 microns thick.

With continuing reference to FIG. 2, ceramic sheets 20a, 20b and 20c are preferably made of a ferromagnetic or ferrimagnetic material such as, for example, ferrite or glass-bonded ferrite.

Bottom sheet 20a of the FIG. 2 example includes via holes 22a 22b that extend through the bottom sheet 20a. Middle sheet 20b includes a slot 24 that extends through the middle sheet 20b. Top sheet 20c is a solid sheet that does not contain holes or slots. Top sheet 20c is preferred, but not necessary.

Via holes 22a 22b and slot 24 are filled with an electrical conductor. The electrical conductor may comprise sintered silver particles, for example. For clarity, the electrical conductor material is not shown in FIG. 2.

Ceramic sheets 20a 20b 20c are sintered such that they are mechanically bonded and magnetically coupled to one another. The holes 22a 22b and slot 24 are joined such that the conductor filling the holes 22a 22b and slot 24 is continuous.

Figure 3:
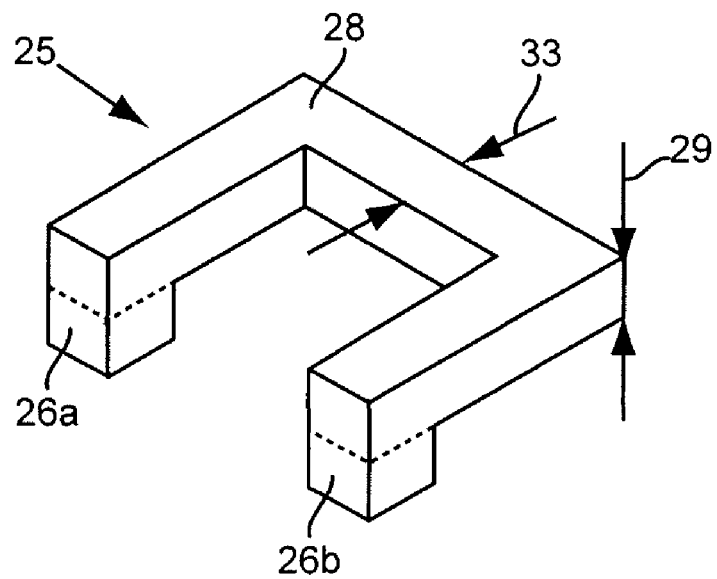
FIG. 3 shows in isolation one illustrative example of a conductor structure in the example FIG. 2 example of one embodiment according to the present invention.

FIG. 3 shows an isolated perspective view of electrical conductor 25 filling vertical holes 22a 22b and filling cut out slot 24 of FIG. 2. Conductor 25 comprises vias 26a 26b and a U-shaped section 28 filling the slot 24. Section 28, fills slot 24 and, therefore, occupies the full thickness of middle sheet 20b. In sharp contrast to the LTCC inductors of the prior art, the U-shaped section 28 is not a thin printed conductor film printed on top of a ceramic sheet. Instead, in the present invention, the section 28 is cast or otherwise disposed in a three-dimensional slot formed in the ceramic sheets 20, such as slot 24.

With continuing reference to FIG. 3, since the slot 24 extends through the sheet 20b the section 28 has a thickness 29 equal to the thickness of the sheet 20b. The sheet 20b may be much greater than the thickness of the printed conductors of the prior art LTCC. Therefore, the section 28 has a much greater thickness, larger cross-sectional area, and low ohmic resistance as compared to the prior art. The LTCC inductor of the present invention is therefore capable of carrying large electrical currents than prior art LTCC inductors. The LTCC inductor of the present invention can therefore be used in voltage regulators, power supplies and other circuits requiring inductors capable of carrying large electrical currents.

Referring to FIG. 2, the terminal ends of slot 24 are aligned above vertical vias 22 formed in sheet 20a. U-shaped section 28 of the electrical conductor 25 can be made of the same material commonly used for vias 26a, 26b as known in the art. For example, U-shaped section 28 can be made of sintered silver particles derived from a paste comprising silver particles, binding agents and a solvent such as an alcohol. The present invention may use sinterable metallic conductive pastes as known in the prior LTCC arts and, therefore, detailed description of the material is not necessary for practicing the invention.

The section 28 has a conductor width 33. Typically, the width 33 is greater than (e.g. 3× or 4× greater) the thickness 29. As can be understood by a person of skill upon applying knowledge in the art to this disclosure, the magnitude of the conductor width 33 influences the inductance, namely a smaller width 33 will result in a larger inductance, and a larger width 33 will result in a smaller inductance.

Figure 4:
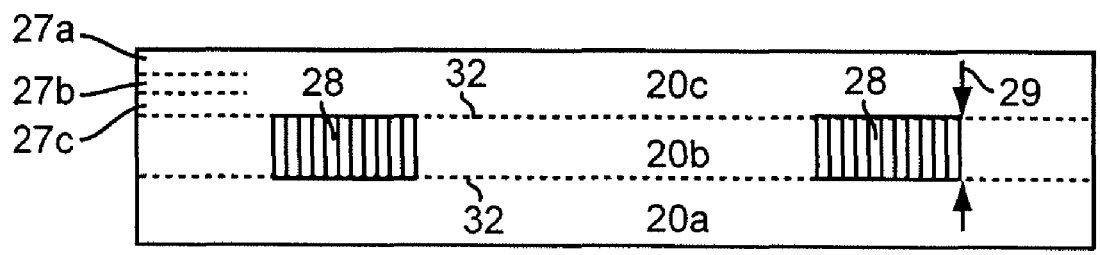
FIG. 4 shows a cross sectional view of the FIG. 2 illustrative example of an embedded high conductance LTCC inductor according to one embodiment of the present invention, assembled and viewed through cut line 4-4.

FIG. 4 shows a cross sectional view of the FIG. 2 example inductor 21, cut along dotted lines 4-4, with the sheets 20 assembled. As seen, the U-shaped section 28 has the same thickness 29 as the middle sheet 20b. The sheets 20a, 20b, 20c are bonded by sintering. Each ceramic sheet 20 may comprise several ceramic layers such as, for example, 27a, 27b, 27c, with each layer about 0.001 to 0.005 inches thick. When cut in cross section, insignificant boundaries 32 may or may not remain at the interface of sheets 20a, 20b, 20c, depending in part on the sintering. The distance between the boundaries 32 indicates the thickness of the middle sheet 20b having the slot 24. One example thickness of the ceramic sheets is approximately 0.010 to approximately 0.05 inches.

The U-shape of the FIG. 2 example slot 24 and the corresponding shape of the electrical conductor 25 filling the slot is only one example. Many different shapes and configuration of a three-dimensional slot such as the example 24 are contemplated by the present invention. For example, the slot 24 and corresponding conductor may be straight, spiral, serpentine or of another shape.

Figure 5A:
FIGS. 5a-5d illustrate one method for fabricating an embedded high current LTCC inductor according to the present invention.

FIGS. 5a-5d illustrate a preferred method for making a high conductance LTCC inductor, such as example 21 illustrated in FIGS. 2, 3, and 4, according to the invention. The preferred steps proceed as follows:

FIG. 5a (side view): A plurality (e.g., three) green ceramic sheets 20 are provided. The ceramic sheets 20 may be, for example, about 0.003" to about 0.20" thick. The ceramic sheets 20 may be made by casting or extrusion of ceramic particle slurry, as known in the art. Each sheet 20 may comprise several laminated ceramic layers (not shown), with each ceramic layer separately formed by casting or extrusion.

Figure 5B:
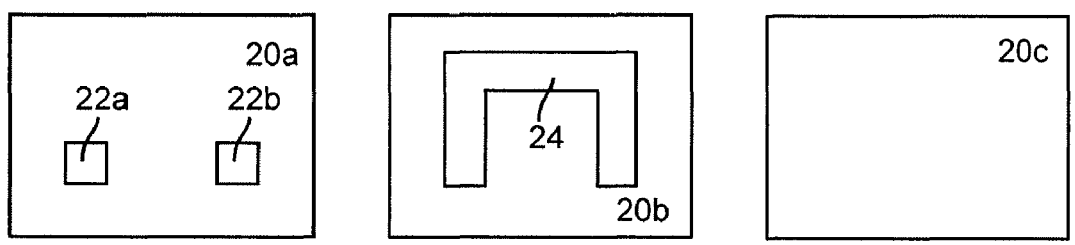

FIG. 5b (top view): Holes 22a, 22b for vias are punched or laser cut in the bottom sheet 20a. Slot 24 for section 28 is punched or laser cut in the middle sheet 20b. Top sheet 20c, which is preferred but not required, does not have holes or slots. If the sheets 20 comprise multiple ceramic layers, the layers can be punched or cut before or after lamination forming the sheets 20.

Figure 5C:
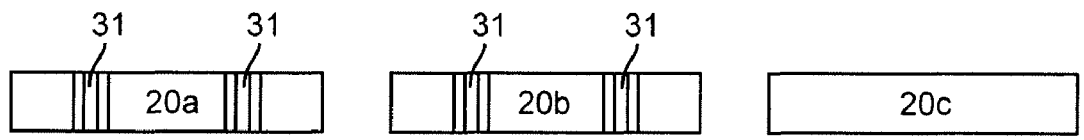

FIG. 5c (cross-sectional side view): Conductive paste material 31 is inserted into the holes 22a, 22b and slot 24. The conductive paste material 31 may be pressed into the slot with a scraper or a stencil, and a screening process may be used to insert the paste.

Figure 5D:
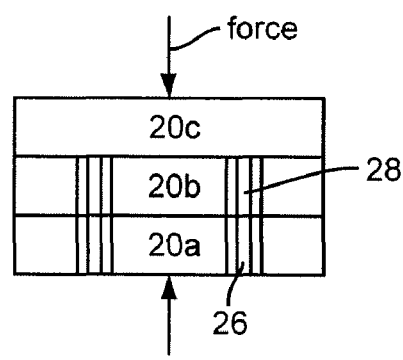

FIG. 5d (cross-sectional side view): The ceramic sheets 20 are stacked such that their respective hole and slots, e.g., holes 22a, 22b and slot 24, are aligned. The stacked sheets are sintered at high temperature. Compressive force may be applied before or during sintering.

Upon sintering, ceramic sheets such as 20a, 20b and 20c may be essentially monolithic, means that the boundaries between the sheets may be substantially undetectable (i.e. the boundaries may be obliterated by the sintering process).

Referring to FIGS. 2-4, all ceramic sheets 20 may have the same permeability, or may have respectively different material or a different formulation of material such that different sheets 20 have different permeability. As described in further detail below, one or embodiments provide inductance that varies, in a given manner, with respect to current. Forming different ones of the sheets (e.g., sheet 20) with different permeability, particularly with respect to the distance between the sheet and the inductor conductor (e.g., the conductor 25), is one example implementing current-dependent variable inductance.

Referring to FIG. 1, in the example module 10 the capacitor 14 is preferably planar, to conform to the supporting surface 12A of the LTCC inductor 12 of the invention and to provide, in turn, a planar support surface 14A not substantially above 12A, to support other components and structures such as, for example, a heat spreader or heat sink (described in more detail in reference to other figures, not shown in FIG. 1 or a printed circuit board, substrate, or discrete components (not shown in FIG. 1).

The capacitor 14 may, but is not necessarily, an LTCC capacitor layer. LTCC capacitors are known in art and, therefore, further description is omitted.

Referring to the example module 10 of FIG. 1, conducting contacts (collectively labeled 18) are formed on the top surface 12A of the embedded high conductance LTCC inductor 12. The specific number and arrangements of the conducting contacts 18 is not shown in FIG. 1, as these are in accordance with contacts (not shown) on the top surface 12A. Referring to the FIG. 2 example 21 implementation of the inductor 12, the conductors 18 on the surface (e.g., 12A) of the inductor 12 are arranged to connect with, for example, the terminals 26a and 26b (illustrated in FIG. 3) that extend through passages 22a and 22b of the sheet 20a to connect to the inductor's extended conductor 25. Sheet 20a of the FIG. 2 example 21 is shown in a lower position but may correspond to the "top" surface 12A of the FIG. 1 example module because, as previously stated, the orientation (e.g., the up-down direction in FIG. 2) is arbitrary.

Similar to the electrical contacts 18, one or more electrical contacts (collectively referenced as 19) are formed on the top surface 14B of the capacitor layer 14. The contacts 19 connect through, for example, vias (not shown) to conductor layers (not shown) forming the various capacitor plates (not shown) within the capacitor layer 14. Formation of vias through layers of a planar capacitor package or structure is known in the art and, therefore, further description is omitted.

For the remainder of this description, conductors such as 18 and 19 that extend vertically from one surface (e.g., surface 12A), to a different (higher or lower) elevation, and the corresponding clearance in any intervening layers for such conductors (e.g. 14A) are generically referenced as "interlayer electrical connections."

If capacitor layer 14 is implemented as an LTCC capacitor layer it may be sintered together with the sintering of the LTCC inductor, in a sintering operation such as that described above in reference to FIGS. 5a-5d. Because of the large contact areas of the capacitor layer 14 with the LTCC inductor layer 12, preferably the capacitor layer is formed of a material having a coefficient of thermal expansion (CTE) compatible with the CTE of the LTCC inductor 12.

Figure 6:
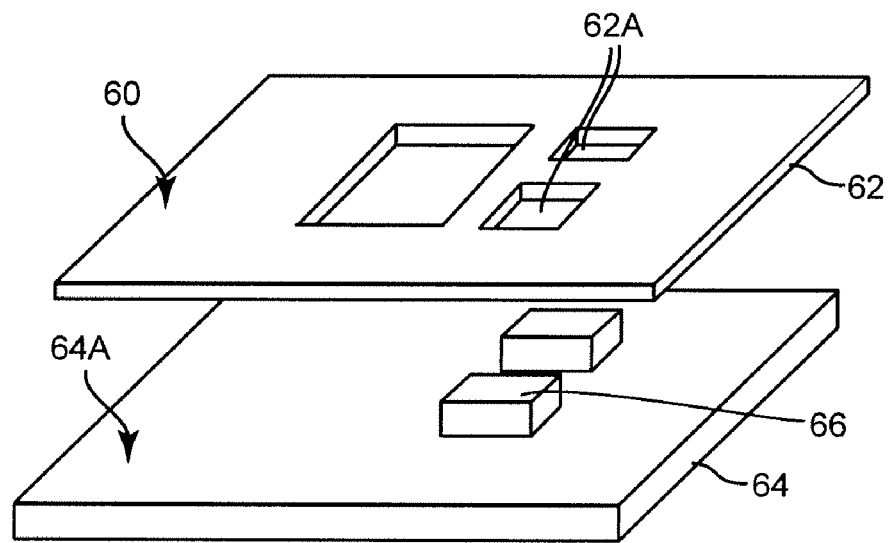
FIG. 6 shows, in a perspective exploded view, an illustrative example of a three-dimensional integrated module according to one embodiment of the present invention, including a planar, low-profile high conductance LTCC inductor, having a support surface, and a low-profile heat spreader disposed on the support surface.

FIG. 6 shows, in a perspective exploded view, one illustrative example three-dimensional integrated module 60 according to one embodiment of the present invention. Module 60 is a laminated or overlaid type, low-profile arrangement of a heat spreader 62 disposed on the top surface 64A of a high conductance LTCC inductor 64 according to any embodiment of the present invention such as, for example, inductor 21 of FIG. 2.

The heat spreader 62 is preferably a high thermal conductivity material such as, for example, aluminum nitride, oxidized aluminum or graphite, to provide improved heat conduction and reduced localized hot spots. The heat spreader 62 may be post processed or pre-processed (i.e. pre-sintered 'green' tapes) materials.

The heat spreader layer 62 may be sintered together the inductor layer 64. Depending on the arrangement of the heat spreader layer 62, clearance or through holes, such as examples 62A, are formed in the heat spreader 62 layer prior to attaching to the LTCC inductor layer 64, or with other layers as described in relation to other embodiments. The clearance holes 62A provide for electrical connections 66 between the layers on top and below the heat spreader layer 62, similar to the electrical connections effectuated by connectors 18 and 19 described in reference to FIG. 1. The thickness of the heat spreader layer 62 may, for example, be greater or equal to 200 μm. One example thickness is approximately 500 μm.

Figure 7:
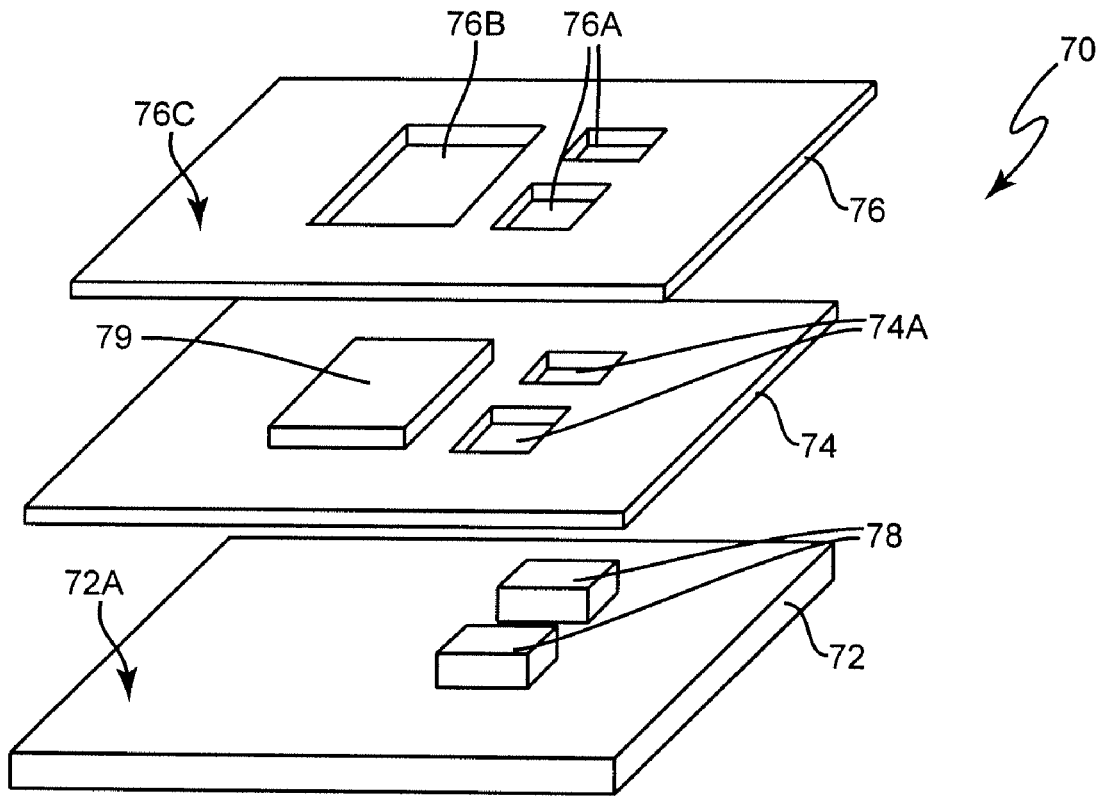
FIG. 7 illustrates, in a perspective exploded view, an illustrative example of a three-dimensional integrated module according to one embodiment of the present invention, including a planar, low-profile high conductance LTCC inductor, having a support surface, and a planar capacitor and a low-profile heat spreader disposed on the support surface.

FIG. 7 illustrates, in a perspective exploded view, one example of one embodiment of a three-dimensional module 70 according to the present invention. The three-dimensional module 70 includes a high conductance planar LTCC inductor 72, implemented according to any embodiment of the LTCC inductor of the present invention, integrated in a low-profile layered, three-dimensional arrangement with a planar capacitor layer 74, and a heat spreader layer 76. The high conductance planar LTCC inductor may, for example, be in accordance with the example 21 described in reference to FIGS. 2, 3, 4 and 5a-5d. The planar capacitor layer may, for example, be structured in accordance with any implementation of layer 14 described in reference to FIG. 1. The heat spreader layer 76 may, for example, be structured in accordance with any implementation of the heat spreader layer 62 described in reference to FIG. 6.

Interlayer electrical connections in the FIG. 7 example may be as follows: Capacitor layer 74 has clearance holes or areas 74A, aligned with similar clearance holes or passages 76A in the heat spreader layer 76. Vertical conductors 78 are disposed on the top surface 72A of the high conductance LTCC inductor layer 72. Vertical conductors or pads 78 connect to pads (not shown) formed on the top surface 72A, which connect to vias (not shown in FIG. 7) extending into the inductor conductor (such as conductor 25 described in reference to FIGS. 2-4, not shown in FIG. 7), embedded within the inductor layer 72. The vertical conductors 78 have thickness or height (not labeled) preferably substantially equal to the combined thickness of the capacitor layer 74 and the heat spreader layer 76. The top (not separately labeled) of the vertical conductors may connect to other layers or electrical components (not shown in FIG. 7) supported or disposed on the top surface 76C of the heat spreader layer 76.

With continuing reference to FIG. 7, vertical conductors or pads 79, connect to pads (not shown) formed on the top surface 74A of the capacitor layer, which connect to vias or other conductor (not shown in FIG. 7) extending into capacitor plates or other conductors embedded in the capacitor layer 72. Various kinds of such vias and surface connections are known in the art. The vertical conductors 79 have thickness or height (not labeled) preferably substantially equal to the combined thickness of the heat spreader layer 76. The vertical conductor 79 extends through a corresponding aligned clearance hole 76B formed in the heat spreader layer 76. Like the top of vertical conductors 78, the top of vertical conductor 79 (not separately labeled) may connect to other layers or electrical components (not shown in FIG. 7) supported or disposed on the top surface 76C of the heat spreader layer 76.

If the capacitor layer 74 is, for example, implemented as an LTCC capacitor layer, the layer 74, heat spreader layer 76 and the high conductance LTCC inductor layer 72 may be sintered together to form the integrated three-dimensional module 70.

With continuing referring to FIG. 7, the capacitor layer 74 is depicted as disposed between the embedded high conductance inductor layer 72 and the heat spreader layer 76, this is only an example ordering. Further, other examples (not shown) according to the embodiment illustrated in FIG. 7 may have one or more inductor layers, such as the high conductance embedded LTCC inductor of, for example, FIG. 2, one or more capacitor layers such as, for example, layer 74, and one or more heat spreader layers such as, for example, layer 76 disposed on the bottom surface (not visible in FIG. 7) of the embedded LTCC inductor layer 72.

Figure 8:
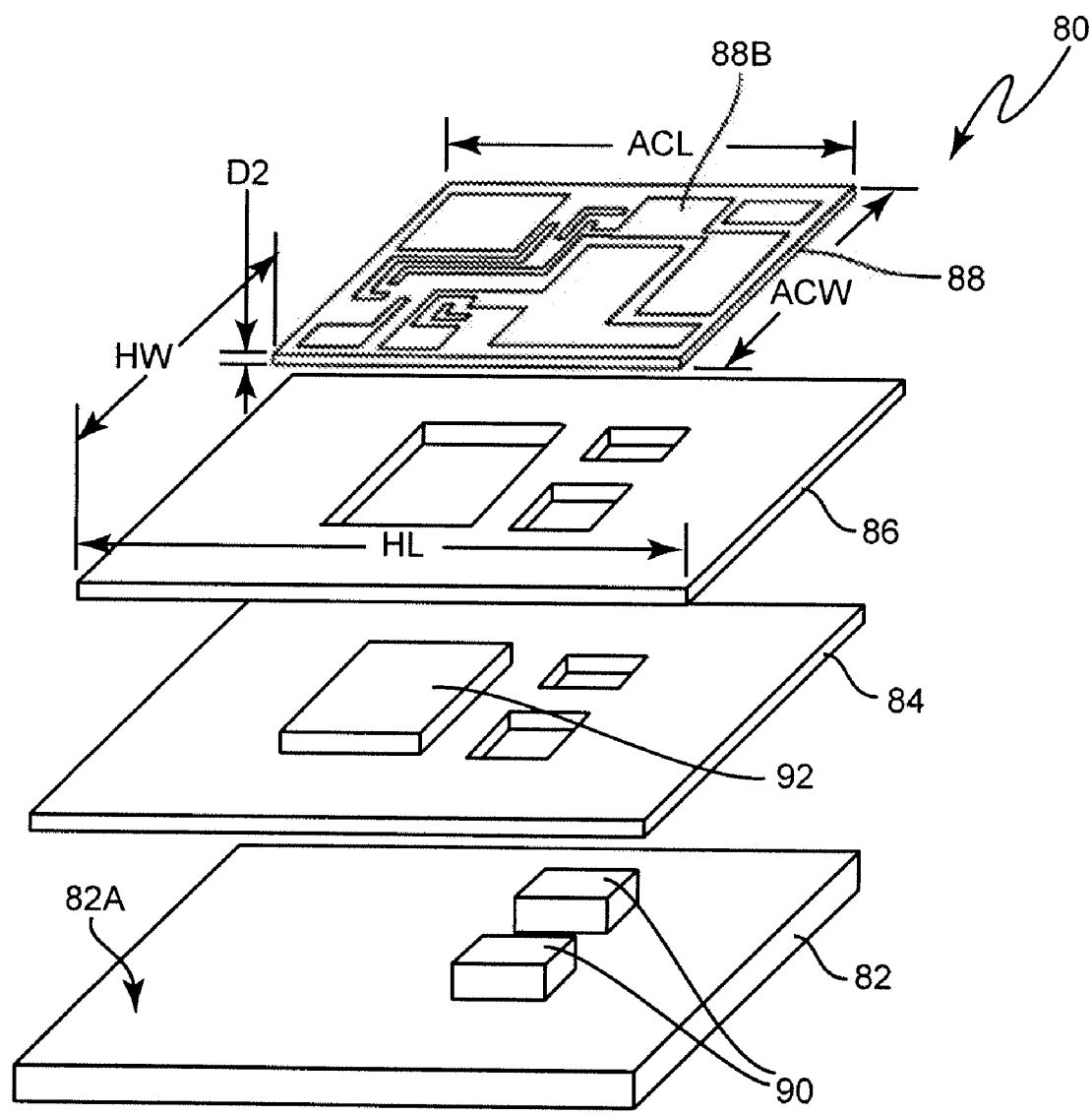
FIG. 8 illustrates, in a perspective exploded view, one illustrative example of a three-dimensional integrated module according to one embodiment of the present invention, including a planar, low-profile high conductance LTCC inductor, having a support surface, and a planar capacitor, a low-profile heat spreader and an active devices layer disposed on the support surface.

FIG. 8 illustrates, in a perspective exploded view, one illustrative example three-dimensional integrated module 80 including a planar, low-profile high conductance LTCC inductor layer 82, having a support surface 82A, a planar capacitor layer 84, a low-profile heat spreader 86 and an active devices layer 88 disposed on the support surface 82A. The high conductance planar LTCC inductor 82 may, for example, be in accordance with the example 21 described in reference to FIGS. 2, 3, 4 and 5a-5d. The planar capacitor layer 84 may, for example, be structured in accordance with any implementation of layer 14 described in reference to FIG. 1. The heat spreader layer 86 may, for example, be structured in accordance with any implementation of the heat spreader layer 62 described in reference to FIG. 6. The heat spreader 86 in the FIG. 8 example has clearances 86B aligned with clearances 84B in the capacitor layer 84.

The active devices layer 88 may be electrically connected to the passives layers, e.g., layers 82 and 84, by means of various known techniques and methods of electrical connection, which include, but are not limited to solder, conductive polymer, metal paste and the like. The FIG. 8 example shows vertical conductors 90 which extend through the clearances 84B and 86B and connect the high conductance LTCC inductor 82 to the actives layer. The conductors 90 may, for example, be structured as the conductors 18 described in reference to FIG. 1. Vertical conductors 92 connect the high conductance capacitor layer 84 to the actives layer 88. The conductors 92 may, for example, be structured as the conductors 19 described in reference to FIG. 1, or as the conductors 79 described in reference to FIG. 7.

The active devices layer 88 may be implemented using various known active device packaging technologies including, without limitation, discrete form (separately packaged) on a printed circuit board made, for example, of "FR4", hybrid form (e.g., packaged using ball grid array, chip scale package, wire bond or equivalent), or embedded in a ceramic carrier as will be described in greater detail. Further, the active devices layer 88 is not necessarily a discrete "layer" and, instead, may comprise devices (not shown in FIG. 8) mounted on the heat spreader layer 86 (or on layer 82 or 84, depending on their stacking order) using various known techniques. The known mounting techniques include, but are not limited to flip chip, wire bonding and direct soldering.

Referring to FIG. 8, the actives layer 88 may be implemented as bare semiconductor dies (not shown), embedded in a post-sintered ceramic carrier (not separately numbered). Techniques and methods for designing and fabricating embedded active circuits are known to persons skilled in the art and, therefore, further detailed description of such techniques is not necessary for skilled persons to practice this invention. For the convenience of the reader, an example summary of one known techniques will be described.

First, holes (not shown) are cut in the ceramic carrier (i.e. by means of laser) to accommodate semiconductor dies (not shown). Techniques for cutting such holes in a ceramic carrier are known to a person skilled in the relevant art. The semiconductor dies are secured to the ceramic carrier by means of adhesive materials dispensed between the ceramic carrier and the semiconductor die. The selection and application of such adhesives may, in view of this disclosure, be in accordance with techniques known the art. The adhesive is then cured (i.e. hardened). As known in the art, the operating temperature determines the type of adhesive material used, typically 100° C.-300° C.

Metallization patterns such as, for example, the patterns generically represented as 88B, are formed on the top and bottom sides of the ceramic carrier with embedded semiconductor dies. The formation of metallization patterns may be in accordance with conventional methods as known in the arts. The overall thickness D2 of the actives layer 88 may, for example, be greater or equal to approximately 200 μm. One example thickness D2 is, readily attainable with known embedded semiconductor technology is approximately 350 μm.

For practicing the FIG. 8 illustrative embodiment of the present invention it is preferable, but not necessary, that the ceramic carrier of actives layer 88 be selected to have a thickness greater or equal to that of the semiconductor dies. As can be understood by persons skilled in the art upon reading this disclosure, selecting a ceramic carrier thickness greater than that of the semiconductor dies enables formation of a substantially smooth top planar surface (not separately numbered), for purposes of, for example, attaching additional discrete components (not shown in FIG. 8).

The actives layer 88 may have planar dimensions ACL and ACW smaller or equal to the lateral dimensions of the supporting passives layer(s) such as, in the FIG. 8 depiction, the lateral dimensions HL and HW of the heat spreader 86. As will be understood in the following description in reference to FIGS. 10A and 10B, forming the actives layer 88 with smaller planar dimension the supporting passives layer(s) allows, for example, a heat sink (not shown in FIG. 8) to contact the heat spreader.

Example embodiments illustrated in FIG. 8, and illustrated in FIGS. 10A, 10B, 11A and 11B, include layers having active devices such as, for example, the layer 88 of FIG. 8, and layers having or embodying passive devices such as, for example, the high conductance embedded LTCC inductor 82, capacitor layer 84 and heat spreader layer 88 of FIG. 8.

Figure 9:
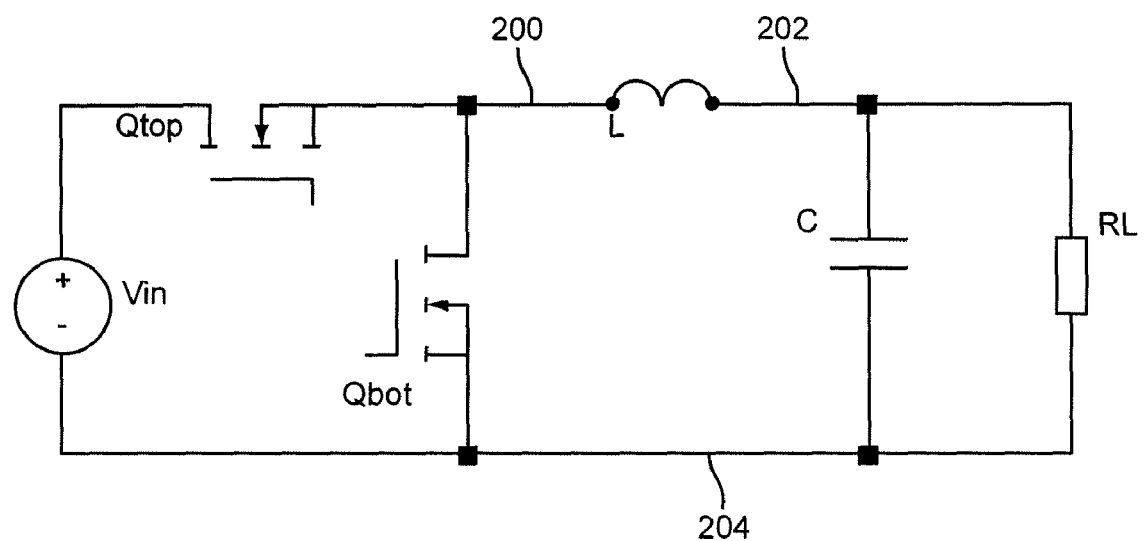
FIG. 9 illustrates a circuit diagram of one example Buck converter.

FIG. 9 illustrates one example of a general circuit diagram of a Buck converter. Referring to FIG. 9, the circuit element Vin represents terminals connected to an external DC supply such as, for a battery (not shown) or an AC-DC rectifier (not shown). The circuit elements Qtop and Qbot represent power-switching transistors, having current switching functions well known in the art of Buck converters. Control circuitry (not shown) controls the switching of transistors Qtop and Qbot. Example circuit diagrams for Buck converter switching control circuits are well known in the art and, therefore, detailed description omitted. Circuit element L represents the output inductor, and circuit element C represents the output inductor. Selection of the values of C and L may be according to the conventional Buck converter arts and, therefore, description is omitted. Block RL represents an external load resistance.

Figure 10A:
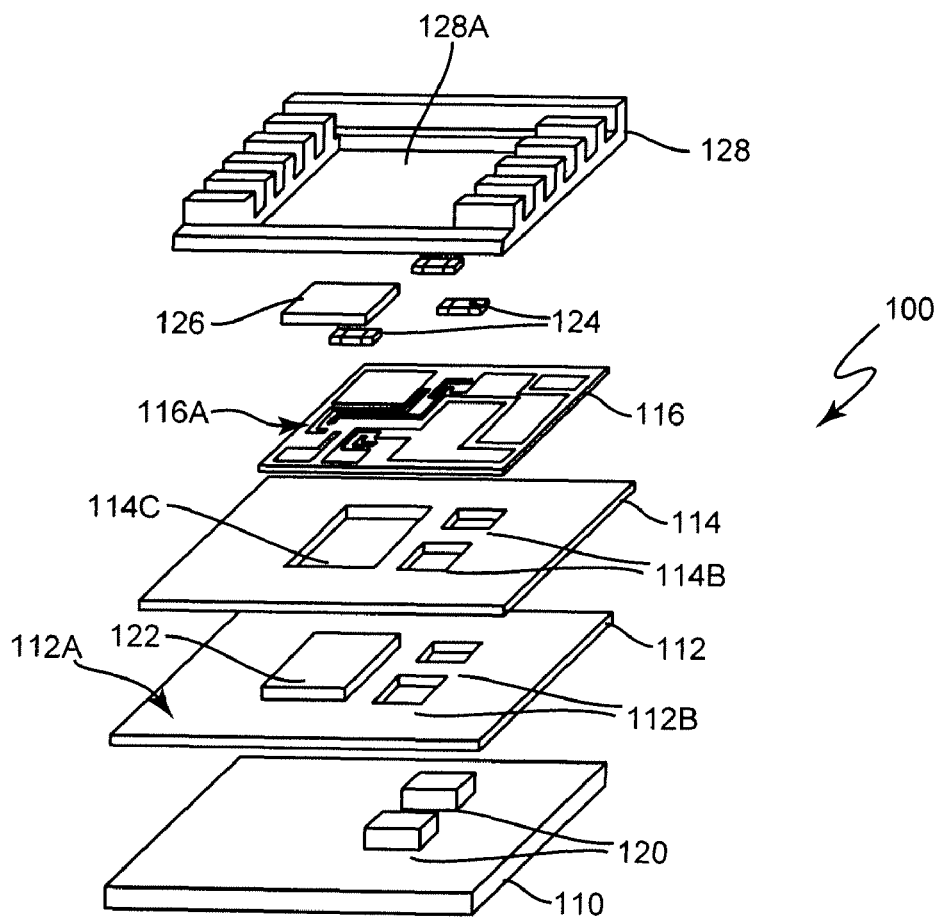
FIGS. 10A and 10B show, in a perspective exploded view and assembled view, respectively, one illustrative example of a three-dimensional integrated Buck converter according to one embodiment of the present invention.
Figure 10B:
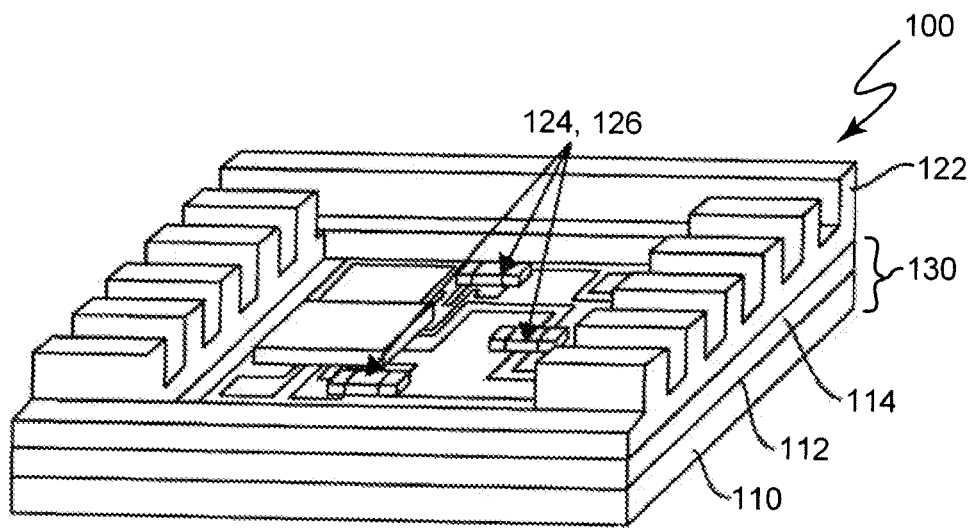

FIGS. 10A and 10B show, in a perspective exploded view and an assembled view, respectively, one illustrative example 100 of a three-dimensional integrated Buck converter module, according to the general circuit diagram of FIG. 9, embodying various features and aspects of the present invention. The example Buck converter module 100 includes a high conductance LTCC capacitor 110, planar capacitor layer 112, and heat spreader layer 114. An actives layer 116 is disposed on the heat spreader 114.

The high conductance LTCC inductor 110 implements at least output inductance L of the FIG. 9 Buck converter circuit diagram. The capacitor layer 112 implements at least the output capacitor C of the FIG. 9 Buck converter circuit diagram. The actives layer 116 implements at least the switching capacitors Qtop and Qbot of the FIG. 9 circuit diagram.

Referring to FIGS. 10A and 10B, the high conductance planar LTCC inductor 110 may, for example, be in accordance with the example 21 described in reference to FIGS. 2, 3, 4 and 5a-5d. The planar capacitor layer 112 may, for example, be structured in accordance with any implementation of layer 14 described in reference to FIG. 1. The heat spreader layer 114 may, for example, be structured in accordance with any implementation of the heat spreader layer 62 described in reference to FIG. 6. The heat spreader 114 has clearances 114B aligned with clearances 112B in the capacitor layer 112, through which vertical conductors 120 extend and connect pads (not shown) on the upper surface 110A of the inductor with pads (not shown) on the lower surface of the actives layer 116. Similarly, the heat spreader 114 has clearances 114C through which vertical conductors 122 extend between and connect pads (not shown) on the upper surface 112A of the capacitor layer 112 with pads (not shown) on the lower surface of the actives layer 118. The vertical conductors 120 may, for example, be structured as the conductors 18 described in reference to FIG. 1, and the vertical conductors 122 may, for example, be structured as the conductors 19 described in reference to FIG. 1. The vertical conductors 120 and 122 may implement, for example, conductor paths represented as 200, 202 and 204 in the FIG. 9 circuit diagram.

The active devices layer 116 may be implemented using various known active device packaging technologies including, an of the techniques identified in the description of actives layer 88 in the embodiment illustrated in FIG. 8. Preferably, to provide a low profile for the module 100 and accommodate a heat sink (such as the example 120 shown in FIGS. 10A and 10B), the actives layer 116 is implemented as semiconductor dies (not shown) embedded in a ceramic carrier.

With continuing reference to FIGS. 10A and 10B, additional passive components, such as snubber capacitors (not shown in the FIG. 9 circuit diagram) may be included in the layer 112 using, for example, printed conductors on LTCC tapes or other arrangements of parallel printed dielectrics and conductors. Further, the high conductance LTCC inductor layer 110, capacitor layer 112 and heat spreader layer 114 may be sintered together into a passives layer, shown as 130 in FIG. 10B.

Additional active devices such as, for example, gate driver chip 126, and passive components such as, for example, monolithic/multilayer ceramic (MLC) capacitors 124 that are not embedded into actives layer 116 or passives layer 130 (or any of its constituent layers 110, 112 and 114) may be mounted on, for example, the top surface 116A of the actives layer 116.

For further heat removal, a heat sink such as, for example, structure 128 may attached or contact to, for example, a peripheral area of the top surface 114A of the heat spreader layer 114. The heat sink 128 may have a center clearance, such as 128A of the depicted example, having a cross-sectional contour slightly larger than the outer contour of the actives layer 116. The center clearance 128A allows both the heat sink 128 and the actives layer 116 to have a large area of direct contact with the heat spreader layer 114, and provides an aligned, low profile arrangement of the actives layer with respect to the passive layer 130. This provides superior heat conduction, in a high density, low profile three-dimensional Buck converter module 100, as depicted in FIG. 10B.

Figure 11A:
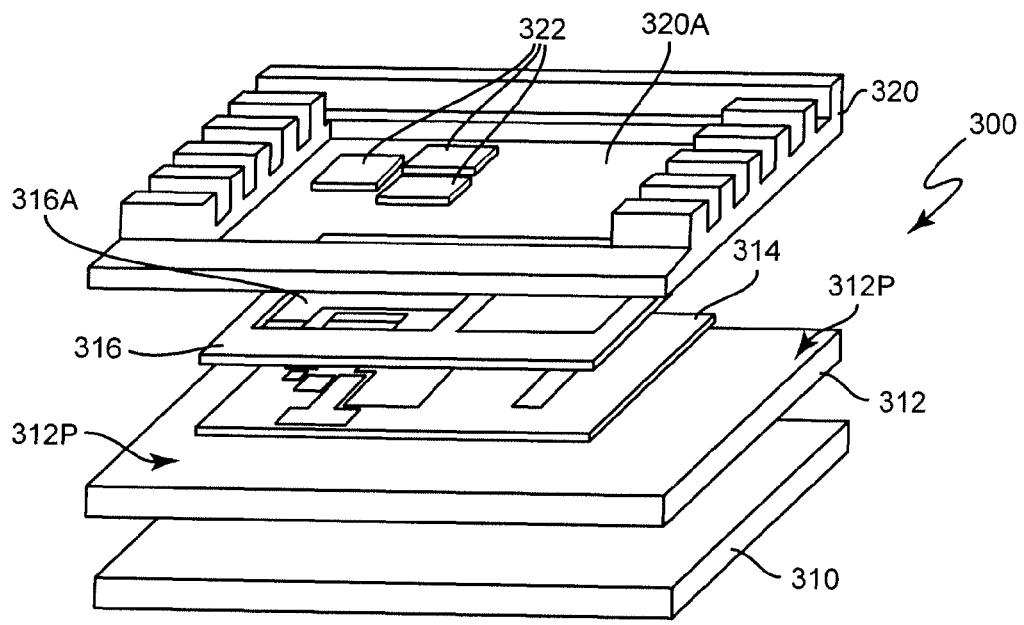
FIGS. 11A and 11B show, in a perspective exploded view and assembled view, respectively, another illustrative example of a Buck converter implemented according to one embodiment of the present invention, having a layer type, low profile arrangement including MLC capacitors and one example embedded high conductance LTCC inductor according any of the described embodiments.
Figure 11B:
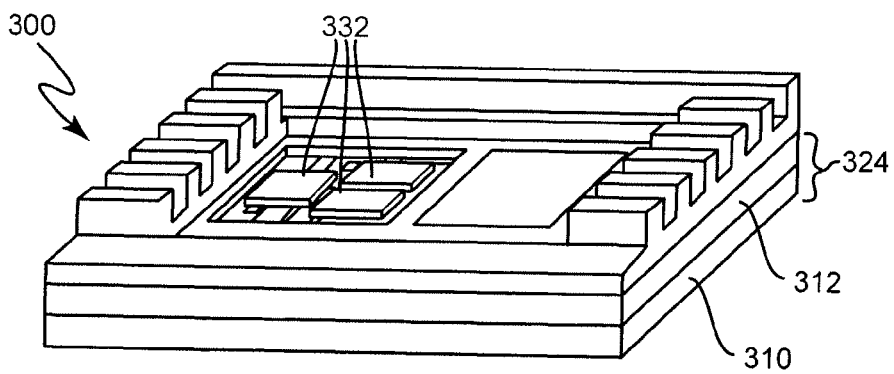

FIGS. 11A and 11B show, in a perspective exploded view and assembled view, respectively, another illustrative example 300 of a three-dimensional module embodying a variation of the invention illustrated in FIGS 10A and 10B. The module 300 of FIGS. 11A and 11B may implement, for example, any SVR circuit. The Buck converter module 300 of FIGS. 11A and 11B includes, in an overlaid or stacked arrangement, a high conductance LTCC inductor layer 310, heat spreader layer 312, an actives layer 314, a capacitor layer 316 and, preferably, a heat sink 320.

The module 300 of FIGS. 11A and 11B may implement a Buck converter such as, for example, a Buck converter according to the FIG. 9 circuit diagram. In such an example, the high conductance LTCC inductor 310 implements at least output inductor L, capacitor layer 316 implements at least the output capacitor C, and the actives layer 314 implements at least the switching capacitors Qtop and Qbot of the FIG. 9 circuit diagram.

The actives layer 314 and the capacitor layer 316 have an outer peripheral contour smaller than the outer peripheral contour of the high conductance LTCC inductor layer 310 and the heat spreader layer 312. The smaller contour of the actives layer 314 and capacitor layer 316, with respect to the outer contour of the high conductance LTCC inductor layer 310 and heat spreader layer 312, provides a peripheral area 312P on the heat spreader 312 which the heat sink 320 directly contacts, as seen in the assembled view of FIG. 11B.

With continuing reference to FIGS. 11A and 11B, the heat sink 320 has an inner clearance 320A larger than the outer peripheral contour of the actives layer 314. Similarly, the capacitor layer 316 is formed with a clearance 316A such that when assembled, as seen in FIG. 11B, active devices such as the example chips 322 may be mounted directly on the upper surface (not separately numbered) of the actives layer 316. Not visible in FIGS. 11A and 11B are vertical conductors, such as, for example, the conductors 18 and 19 described in reference to FIG. 1, or the conductors 120 and 122 described in reference to FIG. 10A, connecting the high conductance LTCC inductor layer 310 and the capacitor layer 316 to the actives layer 316.

Referring to FIGS. 11A and 11B, the high conductance planar LTCC inductor 310 may, for example, be in accordance with the example 21 described in reference to FIGS. 2, 3, 4 and 5a-5d. The heat spreader layer 312 may, for example, be structured in accordance with any implementation of the heat spreader layer 62 described in reference to FIG. 6. The capacitor layer 316 may be any known technology for implementing a planar capacitor of suitable value to be, for example, an output capacitor of a Buck converter, such as capacitor C of FIG. 9 or snubber capacitor (not shown).

The active devices 322 may be mounted on and electrically connected to the actives layer 314. Circuitry patterns (not individually labeled) may be printed on a low k (dielectric constant) layer 314.

The high conductance LTCC inductor layer 310 and heat spreader layer 312 may be sintered together into a passives layer, shown as 324 in FIG. 11B.

Figure 12:
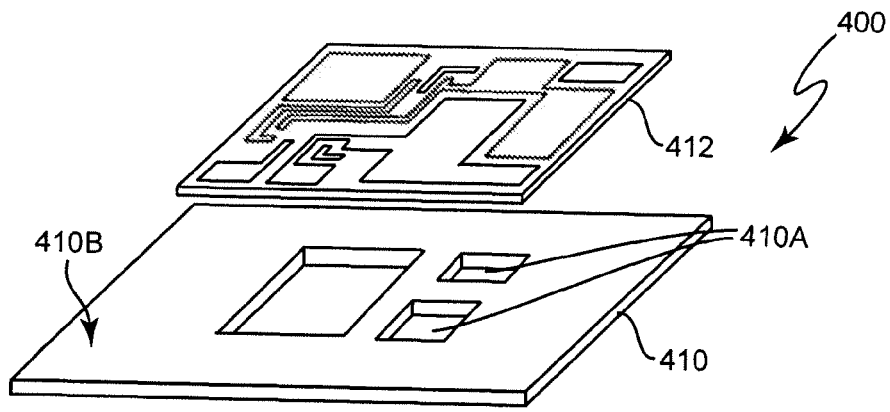
FIG. 12 shows, in a perspective exploded view, an illustrative example of a three-dimensional integrated module according to one embodiment of the present invention, having an arrangement of an active devices layer disposed on a planar heat spreader.

FIG. 12 shows, in a perspective exploded view, one illustrative example of a three-dimensional module 400 according to one embodiment of the present invention, including a stacked or overlaid type arrangement of a planar heat spreader 410 and an active devices layer 412. The heat spreader layer 410 may be formed on any substrate or equivalent planar surface. The active devices layer 412 may be implemented using various known active device packaging technologies including, any of the techniques identified in the description of actives layer 88 in the embodiment illustrated in FIG. 8. The heat spreader layer 410 may have clearance or through holes, such as the illustrative examples 410A, for vertically extending conductors (not shown in FIG. 12). The heat spreader 410A functions to spread heat from localized heat sources, e.g., power devices (not show in FIG. 12) mounted on or embedded in the actives layer 412.

Figure 13:
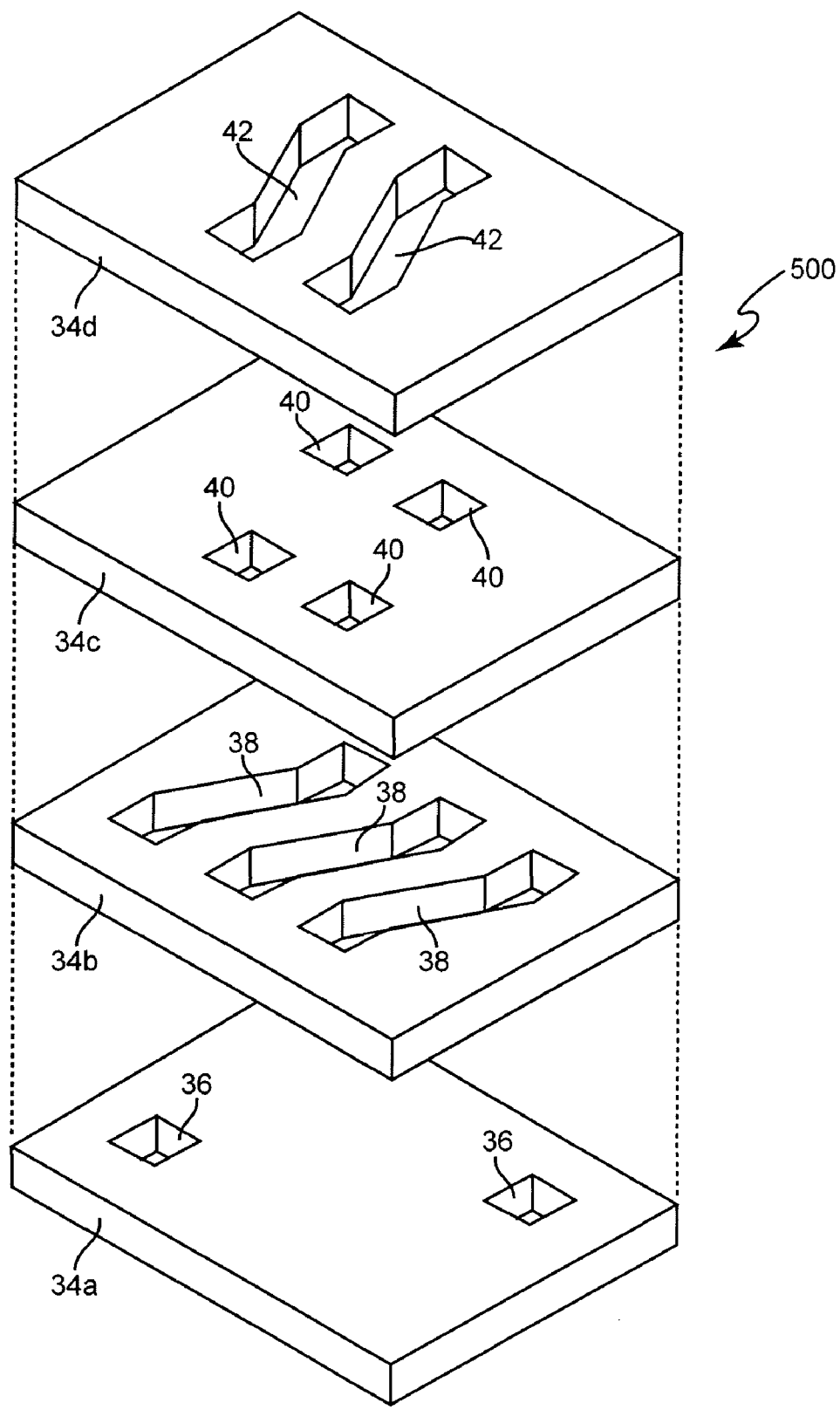
FIG. 13 shows an exploded perspective view of a 2½ turn embedded high conductance LTCC inductor, according to one embodiment of the present invention, with its embedded conductor removed to show the form of the embodiment's slots and vias.

The exemplar high conductance LTCC inductor 21 described in reference FIGS. 2-4 is only one illustrative example of a high conductance LTCC inductor according to the present invention. Other kinds and classes of inductors such as, for example, multiphase inductors, may be implemented in accordance with the present invention. FIG. 13 is an exploded perspective view of a 2½ turn embedded high conductance LTCC inductor 500, according to one embodiment of the present invention, with its embedded conductor (shown in FIG. 14) removed from the figure to show the form of the embodiment's slots and vias. The LTCC inductor 500 is a multi-phase inductor and may, for example, be included in a module according FIGS. 1, 6, 7, 8, 10A-10B or 11A-11b.

Referring to FIG. 13, the slots 38 and vertical passage 36 may be fabricated using the same as process described in reference to FIGS. 5a through 5d, with minor variations in the quantity of sheets, the direction of the slots cut through the sheets, and the location of the vertical holes, that are readily understood by persons skilled in the art upon reading this disclosure.

With continuing reference to FIG. 13, the high conductance LTCC 500 has, for this particular example, four ceramic sheets 34a 34b 34c 34d (collectively 30) forming a 2½ turn inductor. Bottom sheet 34a has holes 36 for vias. Sheet 34b has slots 38 providing the bottom portions of the 2½ turn inductor. Sheet 34c has holes 40 for vias that connect slots in sheets 34b and 34d. Top sheet 34d has slots 42 providing the top portions of the 2½ turn inductor. Optionally, a ceramic sheet without holes or slots (not shown) can be disposed on top of the top sheet 34d so that slots 42 are covered.

Figure 14:
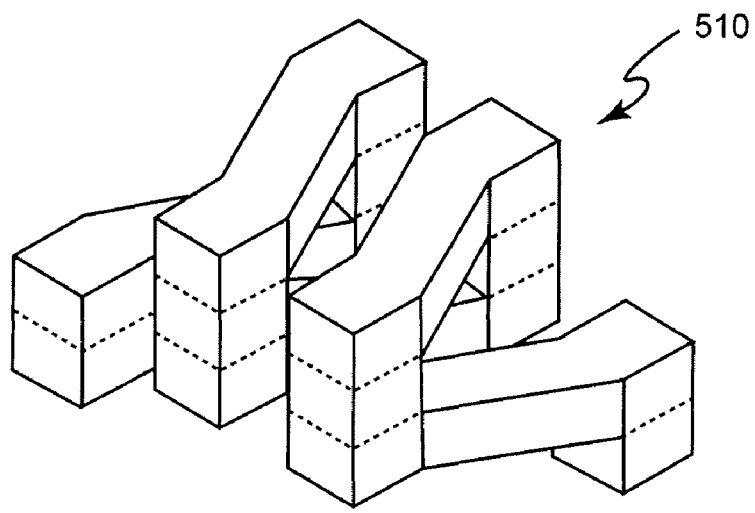
FIG. 14 shows in isolation the 2½ turn conductor embedded in the ceramic sheets of the FIG. 13 example high conductance embedded LTCC inductor according to one embodiment of the present invention.

FIG. 14 shows in isolation the 2½ turn conductor 510 embedded in the ceramic sheets of the FIG. 13 example high conductance embedded LTCC inductor according to one embodiment of the present invention.

Ceramic sheets of high conductance LTCC inductors according to the invention, such as ceramic sheets 20 of the example 21, and ceramic sheets 34 of the example 500, may consist of ferromagnetic or ferrimagnetic material having a distributed air gap. Distributed air gap materials comprising, for example, ferrite ceramic particles mixed with a non-ferromagnetic material such as glass are known in the magnetic material arts. As used herein, the phrase "distributed air gap" also includes a plurality of discrete air gaps having non-ferromagnetic material mixed with ferrite particles, and equivalents.

In the structures, arrangements and combinations of the present invention, a distributed air gap material results in an inductance value that changes with current. Specifically, when the ceramic material has no discrete air gaps, the inductance of the inductor decreases with increasing current. The present inventors have observed that the width of the conductor, e.g. width 33 depicted in FIG. 3, largely determines the amount of decrease of inductance over the output current range.

The variable inductance characteristic provided by the distributed air gap embodiment of the inventive high conductance LTCC inductor results in significant energy efficiency improvements in, for example, voltage regulators, particularly at the high current flowing through the regulator's output inductors. The present inventors observe, without any statement of theoretical conclusion, that a variable inductance providing relatively large inductance value at low currents may increase efficiency by decreasing switching current ripple and, therefore, decreasing switching losses in solid state switching devices (e.g. MOSFETs). The present inventors observe, without any statement of theoretical conclusion, that a variable inductance provided by the air-gap implementation may cause inductance to fall to a desired low value at high currents and, accordingly, have an insignificant effect on energy efficiency at such high currents.

Referring to FIGS. 2-4, one further or alternative embodiment of the high conductance modified LTCC inductor, for additional or further selectivity in variable inductance, forms the inductors' ceramic sheets of (such as the example sheets 20) to each have a different permeability. The different permeability may be obtained by constructing the high conductance modified LTCC inductor as, for example, described in reference to FIGS. 5ad, but using different material or different formulation of material for the different sheets. One example is to use an air-gap material for certain of the sheets 20, or different air-gap characteristics for different ones of the sheets 20. These are only illustrative examples, and other implementations and arrangements for different sheets (e.g. 20) to have different permeability will be apparent to a person skilled in the art upon reading his disclosure.

In the alternative using different permeability for different sheets 20, selecting the specific relation between the permeability of sheets depends on the desired characteristic of inductance versus current. For example, higher inductance at lower current and lower inductance at higher current may be provided by employing higher permeability tapes for the sheets closer to the conductor (e.g. conductor 25) than for sheets spaced further from the conductor. As a further example, to avoid inductance being be too high at low currents, sheets permeability adjacent to the conductor may be selected to have a lower permeability.

It will be understood that different permeability for different sheets is only one implementation, and is not required. Uniform (from sheet to sheet, or over a cross section of the high conductance modified LTCC inductor) is also one implementation, and may be preferable for certain applications. For example, higher permeability tapes (such as may be used to form the sheets 20) may have higher core loss at high frequencies. As a more specific illustrative example, certain magnetic materials (which usually have higher permeability), may be not suitable for applications above, for example, approximately 1 MHz.

Referring to FIGS. 9 and 10A-10B, in the described Buck converter three-dimensional module 100, high conductance LTCC inductor layer 112 may implement the FIG. 9 output inductor L. If the ceramic sheets of the LTCC inductor layer 112 (e.g., sheets 20 of the FIG. 2 example implementation 21) are formed of a distributed air gap material the actual value of L decreases with increasing output current (i.e. current supplied to the load R1) and increases with decreasing output current. The present inventors have identified that in SVRs such as a Buck converter, higher inductance of the output inductor at low output current and lower inductance at high output current increases the SVR's energy efficiency. Without any statement of theoretical conclusion, increased efficiency may result from a high inductance resulting in a smaller switching current ripple, and consequently lower switching losses in the switches, such as the switches Qtop and Qbot of FIG. 9. Hence, the energy efficiency at low output current is significantly improved, and the energy efficiency at high output current will not be significantly affected. The low ohmic resistance of the present inductors maintains high efficiency at high current.

Preferably, the inductance of the output inductor decreases by at least 10%, preferably 20%, 30%, 40%, 50%, or 75% or more at zero output current (maximum inductance) to the maximum rated current (minimum inductance) of the voltage regulator. The geometry of the present inductors, and distributed air gap characteristics will determine the amount of decrease in the inductance with current.

Figure 15:
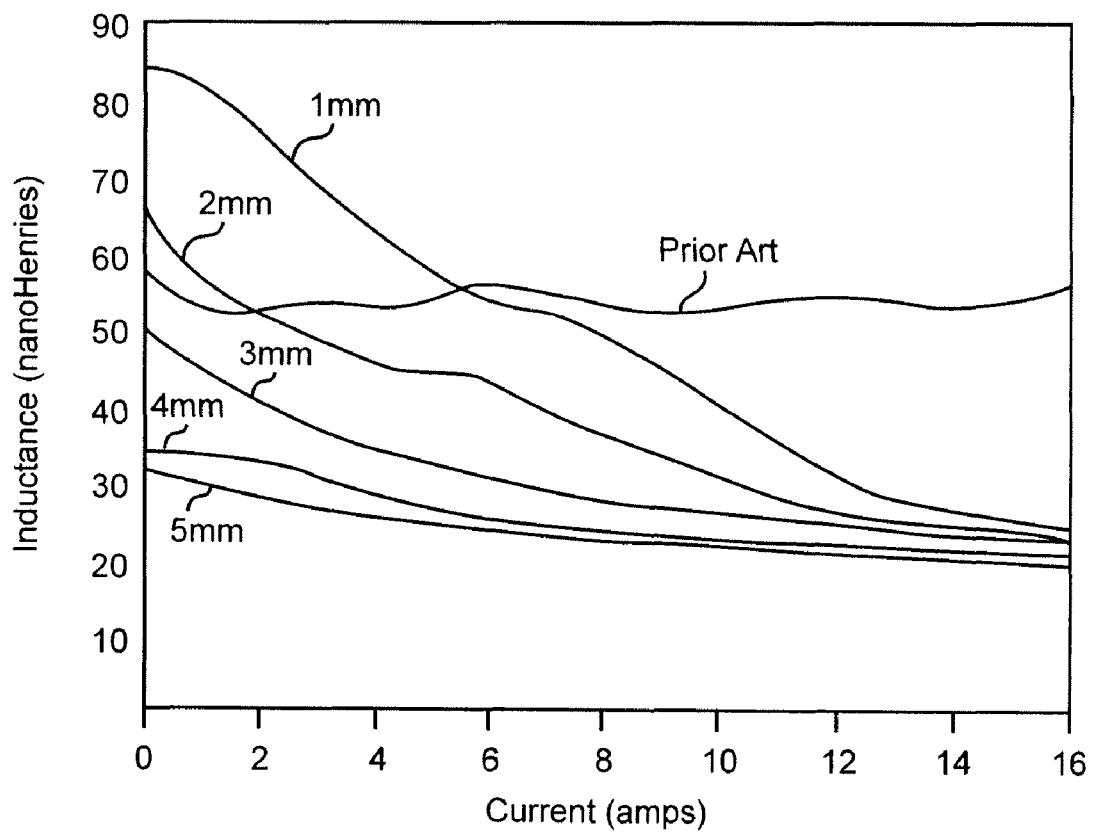
FIG. 15 shows inductance versus output current plots for five high conductance LTCC inductors, with example conductor widths ranging from approximately 1 mm to approximately 5 mm, fabricated according to the present invention, with a distributed air gap ceramic material.

FIG. 15, for example, shows inductance versus output current plots for five high conductance LTCC inductors, fabricated according to the present invention, generally in accordance with the FIG. 2 and FIG. 3 example 21, with a distributed air gap ceramic material. The inductors represented by FIG. 15 have conductor widths (corresponding to width 33 in FIG. 3) of approximately 1 mm, 2 mm, 3 mm, 4 mm, and 5 mm wide. The inductors represented in FIG. 15 have a straight conductor about 15 mm long. As shown, the 1 mm wide inductor has an inductance that decreases from about 85 nH to about 25 nH. The 5 mm wide inductor has an inductance that decreases from about 30 nH to about 20 nH. The plots show that the decrease in inductance appears largest for inductors having narrow conductors. Also illustrated in FIG. 15 is a plot for a conventional fixed (non LTCC) inductor according to the prior art. As shown, the prior art inductor has an essentially constant inductance over the operating current range (0-16 amps).

The present inventors observe, without any statement of theoretical conclusion, that likely improvement of the low current energy efficiency of voltage regulators using the high conductance LTCC inductors of the present invention, should be formed with a narrow conductor (e.g., width 33) as this results in the decrease in inductance being large. The trade-off is that a narrower conductor will have a higher ohmic resistance, and the ohmic resistance losses present performance trade-offs with improvements in switching losses provided by the high inductance values at low output current. A person of ordinary skill in the art, though, upon reading this disclosure can, using modeling tools well known in the arts, identify a practical compromise without undue experimentation.

The above-described examples with variable inductance are only illustrative examples of certain implementations, and are not any limitation on the scope of embodiments of the invention. Implementations having non-variable inductance are contemplated. One example non-variable implementation may be obtained by arranging or constructing a discrete air gap (or non-magnetic material) perpendicular to a magnetic path.

The three-dimensional integrated modules according to the various embodiments and aspects of the present invention are significant advances in the power circuit arts. Due to the planarity and low profile of the module, the thermal performance is superior to a normal surface mount switching power supply. The embodiments provide less turbulent airflow and, because of the top and bottom surface of the high conductance LTCC inductor, a heat spreader may be disposed to provide double sided cooling. Various embodiments provide hybrid integration of active devices and passive components, thereby reducing resistance, and reducing stray reactance. This will help to improve both the light load and heavy load efficiency of the power converter. Various embodiments have passive and active layers arrangements that free significant surface real estate for surface mount devices and components, including embedding the semiconductor switches and the passive components into a substrate, supported by the planar inductor thereby increasing the power density of the entire module.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. An integrated three-dimensional module comprising:
at passives layer comprising at least one of an LTCC capacitor and a planar LTCC high conductance inductor, said LTCC high conductance inductor having ferromagnetic or ferrimagnetic ceramic sheets sintered together, an elongated conductor extending within one or more of the ferromagnetic or ferrimagnetic ceramic sheets, the elongated conductor having a height substantially the same as a height of at least one of the ferromagnetic or ferrimagnetic ceramic sheets, a connection pad having a surface exposed at an external surface of said three-dimensional module, and an inductor connection extending from said connection pad through at least one of the ceramic sheets to said elongated conductor;
a planar heat spreader layer arranged on said passives layer, said heat spreader layer being comprised of materials different from said passives layer, and
an actives layer located adjacent to said heat spreader layer, said actives layer having electrical connections on at least one side thereof and recesses in which active devices may be partially disposed.

2. The integrated three-dimensional module of claim 1, wherein the passives layer and the planar heat spreader layer are a single planar passive layer comprising said layers stacked and sintered together.

3. An integrated three-dimensional module comprising:
a planar LTCC high conductance inductor having ferromagnetic or ferrimagnetic ceramic sheets sintered together, an elongated conductor extending within one or more of the ferromagnetic or ferrimagnetic ceramic sheets, the elongated conductor having a height substantially the same as a height of at least one of the ferromagnetic or ferrimagnetic ceramic sheets, a connection pad having a surface exposed at an external surface of said three-dimensional module, and an inductor connection extending from said exposed external connection pad through at least one of the ferromagnetic or ferrimagnetic ceramic sheets to said elongated conductor;
a planar capacitor layer arranged on said planar LTCC high conductance inductor, a planar heat spreader layer arranged on said planar LTCC inductor, said heat spreader layer being comprised of materials different from said passives layer, and
an actives layer located adjacent to said heat spreader layer, said actives layer having electrical connections on at least one side thereof and recesses in which active devices may be partially disposed.

4. The integrated three-dimensional module of claim 3, wherein said planar LTCC high conductance inductor and the planar capacitor layer form a single planar passive layer comprising said layers in a stacked arrangement.

5. The integrated three-dimensional module of claim 3, wherein said planar LTCC high conductance inductor and the planar capacitor layer form a single planar passive layer comprising said layers stacked and sintered together.

6. The integrated three-dimensional module of claim 3, wherein said planar LTCC high conductance inductor, the planar capacitor layer, and the planar heat spreader layer are a single planar passives layer comprising all of said layers in a stacked arrangement.

7. The integrated three-dimensional module of claim 3, wherein said planar LTCC high conductance inductor, the planar capacitor layer and the planar heat spreader layer form a single planar passive layer comprising said layers stacked and sintered together.

8. The integrated module of claim 6, wherein the planar heat spreader layer and the actives layer are constructed and arranged such that a first area of a top surface of the heat spreader layer is covered by an actives layer and a second area of the top surface of the heat spreader layer is not covered by an actives layer.

9. The integrated module of claim 8, further comprising a heat sink having a bottom surface contacting said second area of the top surface of the heat spreader layer.

10. The integrated module of claim 3, wherein the planar heat spreader layer and the actives layer are constructed and arranged such that a first area of a top surface of the heat spreader layer is covered by the actives layer and a second area of the top surface of the heat spreader layer is not covered by the actives layer.

11. The integrated module of claim 10, further comprising a heat sink having a bottom surface contacting said second area of the top surface of the heat spreader layer.

12. The integrated module of claim 1, wherein the planar heat spreader layer has a clearance hole, extending from a bottom surface to a top surface of said layer, aligned with the connection pad of the planar inductor layer.

13. The integrated module of claim 3, wherein the planar capacitor layer has a clearance hole, extending from a bottom surface to a top surface of said layer, aligned with the connection pad of the planar inductor layer.

14. The integrated module of claim 3, wherein the planar capacitor layer has a capacitor layer clearance hole, extending from a bottom surface to a top surface of said capacitor layer, and the planar heat spreader layer has a heat spreader layer clearance hole, extending from a bottom surface to a top surface of said heat spreader layer, and
wherein said capacitor layer clearance hole and the heat spreader layer clearance hole are aligned with the connection pad of said planar LTCC high conductance inductor.

15. The integrated module of claim 3, wherein the planar capacitor layer has a capacitor layer clearance hole, extending from a bottom surface to a top surface of said capacitor layer, and the planar heat spreader layer has a heat spreader layer clearance hole, extending from a bottom surface to a top surface of said heat spreader layer, and wherein said capacitor layer clearance hole and the heat spreader layer clearance hole are aligned with the exposed external connection pad of said planar LTCC high conductance inductor.

16. The integrated module claim 15, further comprising a conductor extending from said connection pad, through said capacitor layer clearance hole and said heat spreader layer clearance hole, to said actives layer.

17. The integrated module of claim 1, wherein
the actives layer has a first surface area and a second surface area; and wherein
a capacitor layer, arranged on said actives layer, covers said first surface area and does not cover said second surface area.

18. The integrated module of claim 17, wherein the planar heat spreader layer and the actives layer are constructed and arranged such that a first area of a top surface of the heat spreader layer is covered by the actives layer and a second area of the top surface of the heat spreader layer is not covered by the actives layer.

19. The integrated module of claim 17, wherein the actives layer and the capacitor layer are constructed and arranged such that a first area of a top surface of the actives layer is covered by the capacitor layer a second area of the top surface of the actives layer is not covered by the capacitor layer.

20. The integrated module of claim 17, further comprising a heat sink having a bottom surface contacting said second area of the top surface of the heat spreader layer.

21. The integrated module of claim 1, wherein said ferromagnetic or ferrimagnetic ceramic sheets include a first ceramic sheet having a first permeability and a second ceramic sheet having a second permeability, said first permeability being different from said second permeability.

22. The integrated module of claim 21, wherein said first ceramic sheet is spaced more proximal to said elongated conductor than said second ceramic sheet and wherein said first permeability is higher than said second permeability.

23. The integrated module of claim 19, further comprising a heat sink having a bottom surface contacting said second area of the top surface of the heat spreader layer.

24. The integrated module of claim 23 wherein the heat sink is constructed and arranged to provide an exposed area over at least a portion of the second area of the top surface of the actives layer.

25. The integrated module of claim 17, wherein said passives layer includes said planar LTCC high conductance inductor and wherein the planar LTCC high conductance inductor and the planar heat spreader layer are a single planar passive layer comprising said planar LTCC high conductance inductor and the planar heat spreader layer sintered together.

26. The integrated module of claim 18, wherein said planar LTCC high conductance inductor and the planar heat spreader layer are a single planar passive layer comprising said planar LTCC high conductance inductor and the planar heat spreader layer sintered together.

27. The integrated module of claim 17, further comprising a semiconductor device mounted to a top surface of said actives layer.

28. The integrated module of claim 19, further comprising a semiconductor device mounted to a top surface of said actives layer, the mounting being at location in the second area of the top surface of the actives layer.

29. An integrated DC-DC converter module, having an inductor L, an output capacitor C, and switching transistors, comprising:
a planar LTCC high conductance inductor having ferromagnetic or ferrimagnetic ceramic sheets sintered together, an elongated conductor extending within one or more of the ferromagnetic or ferrimagnetic ceramic sheets, the elongated conductor having a height substantially the same as a height of at least one of the ferromagnetic or ferrimagnetic ceramic sheets, connection pad having a surface exposed at an external surface of said three-dimensional module, and an inductor connection extending from said connection pad through at least one of the ferromagnetic or ferrimagnetic ceramic sheets to said elongated conductor, the planar LTCC high conductance inductor being constructed and arranged to have an inductance equal to approximately L;
a planar capacitor layer arranged on said planar LTCC high conductance inductor, having external connection pads, the planar capacitor layer being constructed and arranged to have a capacitance equal to approximately C;
a heat spreader layer comprising materials different from said planar capacitor layer and said planar inductor layer and arranged on the planar capacitor layer; and
an actives layer, having a substrate, and a plurality of semiconductor devices supported by the substrate, arranged on said heat spreader layer, and electrical connections including an actives electrical contact, the actives layer and the semiconductor devices being constructed and arranged to implement the switching transistors, said actives layer having recesses in which active devices may be partially disposed;

a first inter-layer conductor electrically connecting said planar capacitor layer external connection pads to said actives layer; and a second inter-layer conductor electrically connecting said planar capacitor layer external connection pads to said actives layer.

30. The integrated DC-DC converter module of claim 29, wherein said ferromagnetic or ferrimagnetic ceramic sheets include a first ceramic sheet having a first permeability and a second ceramic sheet having a second permeability, said first permeability being different from said second permeability.

31. The integrated DC-DC converter module of claim 30, wherein said first ceramic sheet is spaced more proximal to said elongated conductor than said second ceramic sheet and wherein said first permeability is higher than said second permeability.

32. The integrated DC-DC converter module of claim 29, wherein said planar LTCC high conductance inductor and the planar heat spreader layer form a single planar passive layer comprising said planar LTCC high conductance inductor and the planar heat spreader layer in a stacked arrangement.

33. The integrated DC-DC converter module of claim 29, wherein said planar LTCC high conductance inductor and the planar heat spreader layer form a single planar passive layer comprising said planar LTCC high conductance inductor and the planar heat spreader layer sintered together.

34. The integrated three-dimensional module as recited in claim 1, wherein said active devices at least partially disposed in said actives layer are in the form of bare semiconductor dies connected to said electrical connections on said active layer.

35. The integrated three-dimensional module as recited in claim 3, wherein said active devices at least partially disposed in said actives layer are in the form of bare semiconductor dies connected to said electrical connections on said active layer.

36. The integrated three-dimensional module as recited in claim 29, wherein said active devices at least partially disposed in said actives layer are in the form of bare semiconductor dies connected to said electrical connections on said active layer.

37. The integrated three-dimensional module as recited in claim 1, wherein said actives layer is formed of ceramic.

38. The integrated three-dimensional module as recited in claim 3, wherein said actives layer is formed of ceramic.

39. The integrated DC-DC converter module as recited in claim 29, wherein said actives layer is formed of ceramic.

40. The integrated three-dimensional module as recited in claim 1, wherein said actives layer is of a thickness to be capable of enclosing a said active device a said recess.

41. The integrated three-dimensional module as recited in claim 3, wherein said actives layer is of a thickness to be capable of enclosing a said active device a said recess.

42. The integrated DC-DC converter module as recited in claim 29, wherein said actives layer is of a thickness to be capable of enclosing a said active device a said recess.

* * * * *